United States Patent
Goggins

(10) Patent No.: US 6,490,092 B1
(45) Date of Patent: Dec. 3, 2002

(54) MULTIDIMENSIONAL IMAGING ON A CURVED SURFACE USING LENTICULAR LENSES

(75) Inventor: Timothy P. Goggins, Nashotah, WI (US)

(73) Assignee: National Graphics, Inc., Brookfield, WI (US)

( * ) Notice: Subject to any disclaimer, the term of this patent is extended or adjusted under 35 U.S.C. 154(b) by 0 days.

(21) Appl. No.: 09/536,246

(22) Filed: Mar. 27, 2000

(51) Int. Cl.[7] .............................................. G02B 27/10
(52) U.S. Cl. ...................................... 359/619; 359/623
(58) Field of Search ................................ 359/619, 621, 359/455, 620, 623, 624, 626, 456, 457, 459, 463, 542; 355/22, 77; 264/1.1

(56) References Cited

U.S. PATENT DOCUMENTS

| | | | |
|---|---|---|---|
| 4,158,501 A | 6/1979 | Smith et al. | 355/77 |
| 4,475,661 A | 10/1984 | Griffin | 215/366 |
| 4,481,050 A | 11/1984 | Gundlach et al. | 156/58 |
| 4,557,954 A | 12/1985 | Gundlach et al. | 428/29 |
| 4,600,297 A | 7/1986 | Winnek | 355/22 |
| 4,853,769 A | 8/1989 | Kollin | 358/88 |
| 4,903,069 A | 2/1990 | Lam | 355/22 |
| 4,924,356 A | 5/1990 | French et al. | 362/31 |
| 5,035,929 A | 7/1991 | Myers et al. | 428/30 |
| 5,113,213 A | 5/1992 | Sandor et al. | 355/22 |
| 5,266,995 A | 11/1993 | Quadracci et al. | 355/77 |
| 5,276,478 A | 1/1994 | Morton | 355/22 |
| 5,278,608 A | 1/1994 | Taylor et al. | 355/22 |
| RE35,029 E | 8/1995 | Sandor et al. | 355/22 |
| 5,448,322 A | 9/1995 | Bacs, Jr. | 354/112 |
| 5,455,689 A | 10/1995 | Taylor et al. | 358/450 |
| 5,479,270 A | 12/1995 | Taylor | 358/488 |
| 5,488,451 A | 1/1996 | Goggins | 355/77 |
| 5,500,712 A | 3/1996 | Miyawaki et al. | 355/22 |
| 5,543,874 A | 8/1996 | Winnek | 354/112 |
| 5,617,178 A | 4/1997 | Goggins | 355/22 |
| 5,642,226 A | 6/1997 | Rosenthal | 359/619 |
| 5,790,086 A | 8/1998 | Zelitt | 345/32 |
| 5,825,456 A | 10/1998 | Tabata et al. | 351/201 |
| 5,847,808 A | 12/1998 | Goggins | 355/22 |
| 5,892,538 A | 4/1999 | Gibas | 348/43 |
| 5,896,230 A | 4/1999 | Goggins | 359/619 |
| 6,226,127 B1 * | 5/2001 | Dunn et al. | 283/91 |
| 6,251,566 B1 * | 6/2001 | Brosh et al. | 359/455 |
| 6,424,467 B1 * | 7/2002 | Goggins | 359/626 |

* cited by examiner

Primary Examiner—Georgia Epps
Assistant Examiner—Saeed H Seyrafi
(74) Attorney, Agent, or Firm—Whyte Hirschboeck Dudek SC

(57) ABSTRACT

Methods are disclosed for preparing and applying an interlaced image to a curved surface. In one embodiment of the invention, a method for preparing an interlaced image for application to a curved surface, the interlaced image comprising two or more frames, such that when the interlaced image is viewed through a lenticular lens, the lens comprising a plurality of lenticules and having a base resolution, from a predetermined viewing distance, the interlaced image is viewed substantially free of distortion, the method comprising the steps of:

A. determining the base resolution of the lens;

B. determining a resolution of the lens when the lens is configured to conform to the curved surface;

C. manipulating the interlaced image, the image comprising interlaced segments, to conform with the resolution of the lens as applied to the curved surface such that the lenticules of the lens are in correspondence with the segments of the image; and D. outputting the interlaced image for application to the curved surface.

14 Claims, 9 Drawing Sheets

MULTIDIMENSIONAL IMAGING ON A CURVED SURFACE USING LENTICULAR LENSES

BACKGROUND OF THE INVENTION

The present invention relates generally to multidimensional imaging using lenticular lenses, and more particularly to a method for manipulating a planar multidimensional image so that when viewed through a lenticular lens the image can be viewed on a curved surface with little, if any, distortion.

Successful sales of a product depend not only on the quality of the product itself, but also on the uniqueness of the advertising for the product. Advertising takes many forms and spans many media, but often, the best advertising is on the product itself or on its packaging. To improve sales, bright color schemes and glitzy decor are often utilized to call potential customers' attention to the product. Recently, lenticular lens technology, which allows for multidimensional imaging on a two-dimensional, or planar, surface has come into increasing use in product and point-of-purchase displays.

Lenticular lenses are well-known and commercially available. Methods for using lenticular lens technology are described in detail in U.S. Pat. Nos. 5,113,213; 5,266,995; 5,488,451; 5,617,178; 5,847,808; and 5,896,230 (all of which are incorporated herein by reference).

Lenticular technology is already in use on a variety of items, such as: promotional buttons, magnets, coasters, collectibles, display posters, signs, menu boards, packaging on boxes, postcards and business cards. Lenticular technology is also in use on point-of-sale materials such as product labels and the like. These applications have a common characteristic in that the lenticular technology has been applied generally to planar or flat surfaces.

Indeed, the results when attempting to apply lenticular technology to curved surface have been less than desirable. Those skilled in the art have found that when attempting to apply lenticular technology to such curved applications, the viewer, when viewing at a predetermined viewing distance, experiences distortion. This distortion might take any of a number of forms, e.g., from seeing different images at different viewing angles (i.e., banding), to experiencing blurring or bleeding of the image. If these problems were solved, the underlying image would appear to the viewer as one continuous band, rather than the viewer experiencing multiple, broken, or banded images.

U.S. Pat. No. 5,642,226 to Rosenthal (which is incorporated herein by reference) describes a lenticular optical system in which image lines are compressed so that a curved image changes as a whole. Rosenthal discloses a drawing of an image on a curved, i.e., cylindrical, surface. Rosenthal teaches aligning each image line under a corresponding lenticule. Aligning the image lines equally under the lenticules creates a narrow viewing band that follows the viewer as the cylinder is turned or if the cylinder is stationary, as the viewer moves around the cylinder. Rosenthal, however, fails to describe the significant difference in optical properties of a simple curved surface and a cylindrical surface. For example, proper imaging to a curved geometric surface requires manipulating the interlaced image based on multiple variables. The variables are dependent on the curved surface. Additionally, each variable is dependent upon the shape of the surface to which the image will be applied.

What is needed, therefore, is a method for applying lenticular technology to curved surfaces so that the viewer, when viewing the multidimensional image, experiences little, if any, image distortion. To this end, a method is required for manipulating an image so that when it is applied to a curved, e.g., a frustoconical, surface and viewed through a lenticular lens, the image is substantially free of distortion. Therefore, the desired three-dimensional effect is achieved for the viewer when viewing the image at the appropriate viewing distance.

SUMMARY OF THE INVENTION

In one embodiment, the present invention provides a method for applying multidimensional imaging using lenticular lenses to a curved surface, e.g., a frustoconical or parabolic surface, such as the type found in various packaging, point-of-purchase displays and other forms of advertising. The invention allows a viewer to see the image from a predetermined distance without experiencing significant image distortion. The method is predictable and reproducible, and thus it decreases the variance from project to project and this, in turn, decreases production costs.

These benefits are achieved by a method for preparing an interlaced image for application to a curved surface, the interlaced image comprising two or more frames, such that when the interlaced image is viewed through a lenticular lens, the lens comprising a plurality of lenticules and having a base resolution, from a predetermined viewing distance, the interlaced image is viewed substantially free of distortion, the method comprising the steps of:

A. Determining the base resolution of the lens;

B. Determining a resolution of the lens when the lens is configured to conform to the curved surface;

C. Manipulating the interlaced image, the image comprising interlaced segments, to conform with the resolution of the lens as applied to the curved surface such that the lenticules of the lens are in correspondence with the segments of the image; and D. Outputting the interlaced image for application to the curved surface.

In another embodiment of the present invention, a substantially flat, composite blank is provided for the construction of an article having at least one curved surface, the composite blank comprising:

A. a substrate having first and second opposing surfaces;

B. an interlaced image; and

C. a lenticular lens sized and shaped to overlay the substrate, the lens comprising a plurality of lenticules, the lens having
  (i) a first flat surface, and
  (ii) a second opposing surface comprising lenticules, with the proviso that the image is carried on the first flat surface and that the lenticules of the lens are in correspondence with the interlaced image such that the image can be viewed through the lenticular lens by a viewer at a predetermined viewing distance from the image with minimal, if any, distortion.

In still another embodiment of the present invention, a method is provided for making a substantially flat, composite blank for the construction of an article comprising at least one curved surface, the method comprising the steps of:

A. printing an interlaced image to one of a lenticular lens and a substrate such that the image is in correspondence with the lens;

B. cutting the lenticular lens to a shape corresponding to the shape of the article projected in a planar configuration;

C. applying an adhesive to at least one of the substrate and the lenticular lens;

D. applying the cut lenticular lens to the substrate to form a composite blank precursor; and E. cutting the composite blank precursor to a shape corresponding to the article projected in a planar configuration to create the composite blank.

In another embodiment, a substantially flat lenticular blank for configuration into a curved surface is provided, the lenticular blank comprising:

A. an interlaced image;

B. a lenticular lens comprising a plurality of lenticules, the lens having
(i) a first flat surface, and
(ii) a second opposing surface comprising lenticules, and C. a coating layer;

wherein the image is carried on the first flat surface such that the lenticules of the lens correspond with the interlaced image so that the image can be viewed through the lenticular lens by a viewer at a predetermined viewing distance from the image with minimal, if any, distortion when the image is configured into the curved surface.

In yet another embodiment, a method is provided for making a substantially flat lenticular blank for configuration into a curved surface, the method comprising the steps of:

A. affixing an interlaced image to a lenticular lens such that the image is in correspondence with the lens;

B. applying a coating layer to the image; and

C. cutting the lenticular lens to a shape corresponding to the curved surface projected in a planar configuration.

And in another embodiment, a method is provided for making a substantially flat, composite blank for the construction of an article comprising at least one curved surface, the blank comprising at least one lip to facilitate the construction of the article, the method comprising the steps of:

A. printing an interlaced image to one of a lenticular lens and a substrate such that the image is in correspondence with the lens;

B. applying an adhesive to at least one of the substrate and the lenticular lens;

C. mounting the lenticular lens to the substrate;

D. cutting a portion of the lenticular lens;

E. cutting the substrate along a desired perimeter to form the composite blank; and F. removing a portion of the lenticular lens.

Various other features, objects and advantages of the present invention will be made apparent from the following detailed description and the drawings.

DETAILED DESCRIPTION OF THE PREFERRED EMBODIMENT

Figure 1:
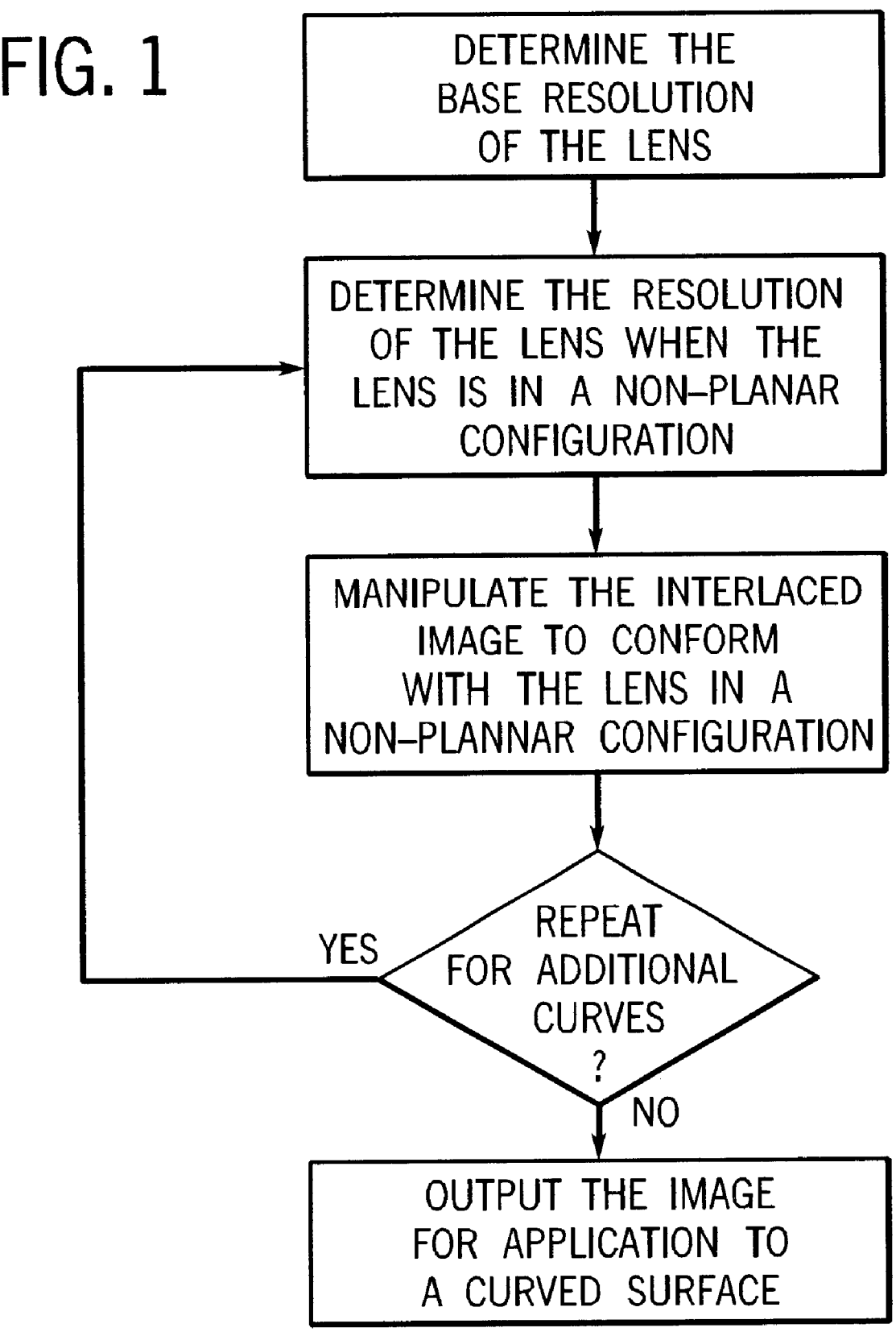
FIG. 1 is a flowchart describing one embodiment of a method for preparing an interlaced image for application to a curved surface.

The present invention provides a method of applying interlaced images to a curved surface such that there is little, if any, distortion from a predetermined viewing distance. The images themselves are preferably of photographic quality, and provide the viewer with the illusion of motion and/or depth. Referring to FIG. 1, preferably, the base resolution of the lens is determined by any conventional technique. "Resolution" in this context means the number of lenticules per linear inch. Even if the resolution is known from the manufacturer of the lens, often an independent confirmation of the resolution is desirable because it is a factor in constructing and manipulating the interlaced, composite image. Furthermore, manufacturing always introduces a variance to one extent or another, and thus, it is desirable to determine the base resolution.

Figure 2:
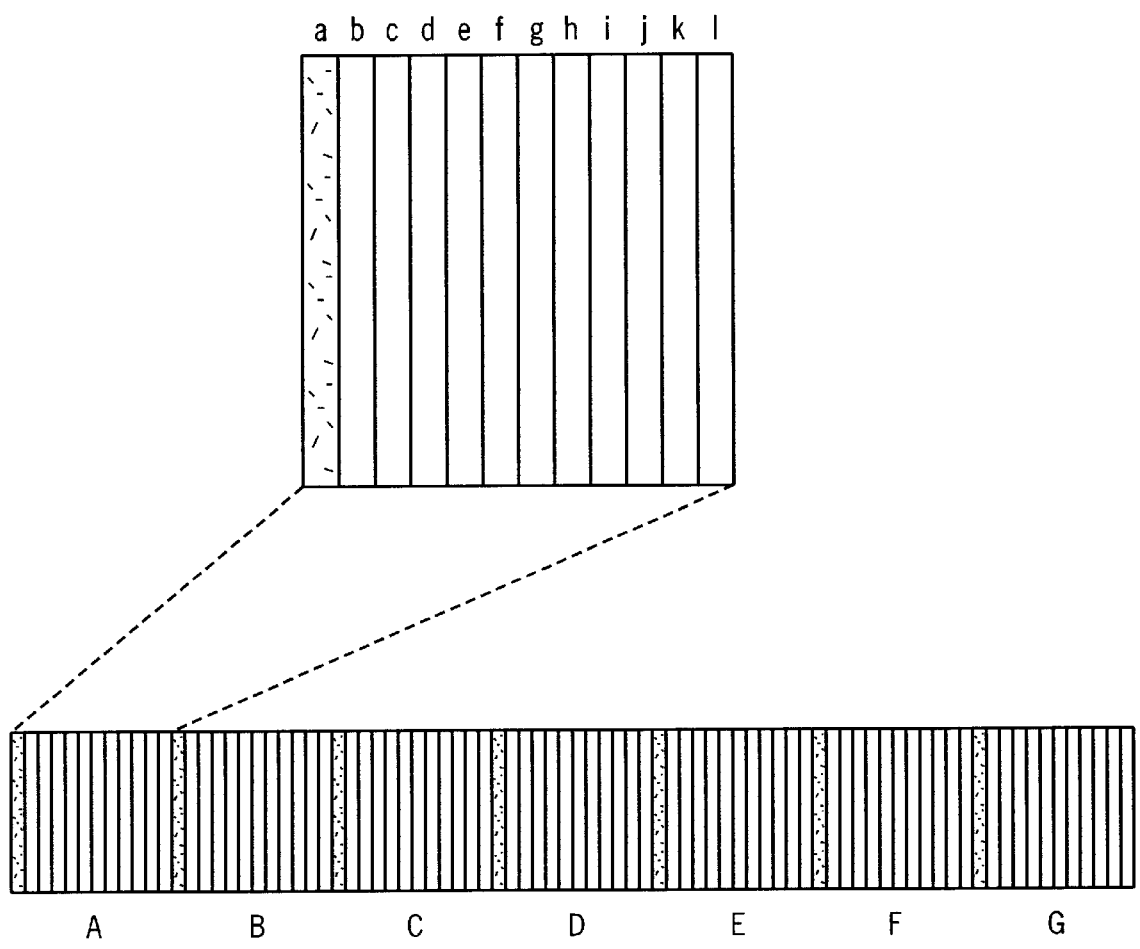
FIG. 2 is an illustration of a resfinder useful in determining the resolution of a lenticular lens.

One method of determining the base resolution of the lens is through the use of a resfinder, one embodiment of which is shown in FIG. 2. Resfinders are particularly useful in determining the base resolution of lenses that are the subject of high volume production runs. As depicted in FIG. 2, a resfinder is preferably a series of identical interlaced segments A, B, C, etc., of an image, each interlaced segment comprising a series of columns or rows (shown in FIG. 2 as columns) a, b, c, etc. which are segments of a series or set of frames. Typically, one such column of each interlaced segment is black and the remaining columns are white. (As depicted in FIG. 2, the black columns are "dashed"). The position of the black column of each interlaced segment is the same, e.g., the black column is the "a" column of each interlaced segment. The columns within an interlaced segment are typically of equal width, and typically the number of columns are the same from interlaced segment to interlaced segment. Resfinder patterns, such as that shown in FIG. 2, of the appropriate resolution can be created through the use of various commercially available software programs such as Adobe™ Photoshop™, manufactured by Adobe Systems Inc. of San Jose, Calif.

The resfinder, or a set of resfinders, of known resolution is/are created and outputted. Typically the output is a negative film imaged on a contract proof. One such proof is 3M's Matchprint™, by Imation™.

The resfinder, specifically its interlaced pattern, is then manipulated or aligned with the lenticules of the lenticular lens to achieve a one-to-one correspondence. This alignment is made when the lenticular lens is in a planar configuration. As here used, "planar" means flat. If all of the segments of the resfinder are aligned with the lenticules of the lens, then one-to-one correspondence is achieved and the resolution of the lens is determined (or confirmed) since the resolution of the lens is the same as the resolution of the resfinder (which is known from its construction). If correspondence is not acquired, i.e., one or more interlaced segments is not in alignment with a corresponding lenticule, then a new resfinder is prepared and this step of alignment repeated until correspondence is acquired. Using the example of FIG. 2, the appearance of a solid black image (described in greater detail below) through the lens is indicative that correspondence has been acquired. "Correspondence" means that each interlaced segment of the resfinder is covered by one lenticule and that the lenticule and interlaced segment are substantially congruent with one another.

In order to create an image that will provide a viewer with a multidimensional effect (including, perhaps, an illusion of motion), first an interlaced image must be created. The interlaced image is an image formed from two or more base or component images. Typically, twelve pictures are interlaced with one another in any desired sequence to form the interlaced image or picture that is then viewed through a lenticular lens. The lenticular lens in conjunction with the interlaced image provides the illusion of depth and/or motion to the viewer.

For proper interlacing, the component images are in digital form, or pixels, so that they can be manipulated electronically. Illustrative images include photographs, graphics, typeface, logos, animation, video, computer-generated or digital art, vignettes, tints, dimensional art, graphs, charts and similar information. If these images are conventional print or art, then they are first converted into electronic data using, for example, optical scanning methods. Alternatively, the images are created electronically by some other conventional means, e.g., commercially available art software.

For those interlaced images from which an illusion of motion is desired, the component images are sequenced in an order that imparts an illusion of motion. For example, if an image of a child swinging is desired, then two or more pictures of the child taken at different points in the swing path are acquired and sequenced in a manner that accurately describes the swing path.

Once all of the information that is to be included in the interlaced image is in electronic or pixel form, a series of digital frames is created. Such frames will make up the interlaced image. Each digital frame is a unique image, and two or more images are used. Each digital frame could itself be comprised of more than one component image or element. Such digital frames are composite frames. These composite frames are used to create an interlaced, composite image. Each digital frame may be created to impart motion and/or a multidimensional effect as desired.

Digital frames are typically created using Adobe™ Photoshop™. The digital frames may then be sequenced or interlaced by any convenient method, for example, the methods described in U.S. Pat. Nos. 5,488,451 and 5,896,230, referenced earlier.

Typically a segment of each frame is in the form of a rectangular column and the height and width of each such column is the same. These frames will then make up interlaced segments. The width of a segment typically mimics the width of the lenticule with which it will eventually be aligned so the viewer perceives a one-to-one correspondence. However, in reality, the curved surface to which the image and lenticular lens are applied requires that the image must be larger than the corresponding lenticular, i.e., it "grows." The number of frames can vary to convenience, and typically the more frames per image, the better the illusion of motion and/or depth.

Once the interlaced image is formed, it is then aligned with the lenticular lens such that the segments of the composite image are "in resolution", or correspondence with the lenticules of the lens. Such "correspondence" means that each segment of the interlaced image is covered by one lenticule and that the lenticule and segment are substantially congruent with one another.

Correspondence is easily confirmed by viewing the interlaced image through the lenticular lens at a predetermined viewing distance. If the image is without distortion and imparts the desired depth and/or motion effect, then correspondence is acquired. If it is not, then process continues in an iterative manner until correspondence is acquired.

Figure 3:
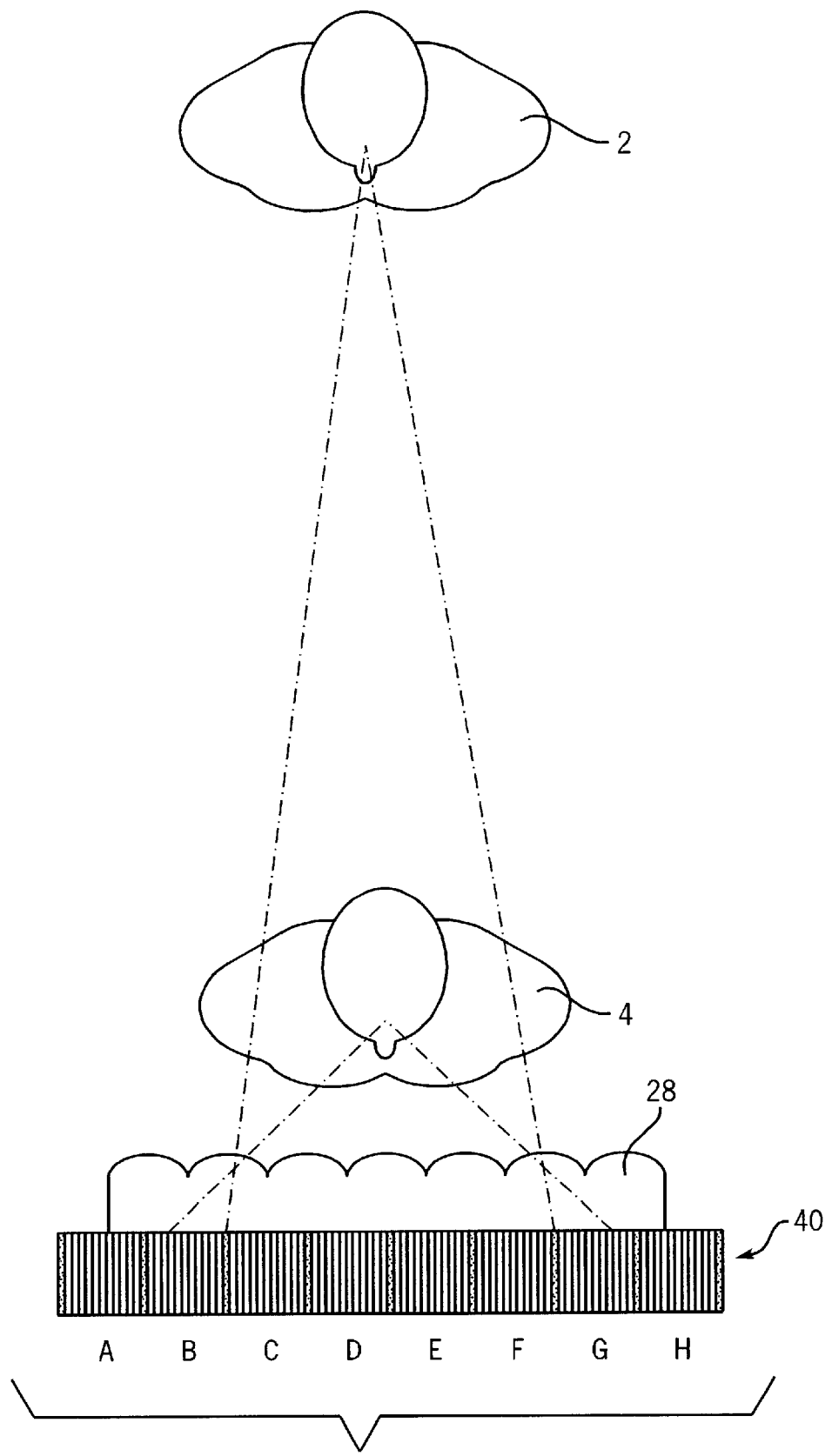
FIGS. 3 and 4 illustrate the concept of correspondence between an image and a lenticular lens for a viewer when viewing at long and short viewing distances, respectively.
Figure 4:
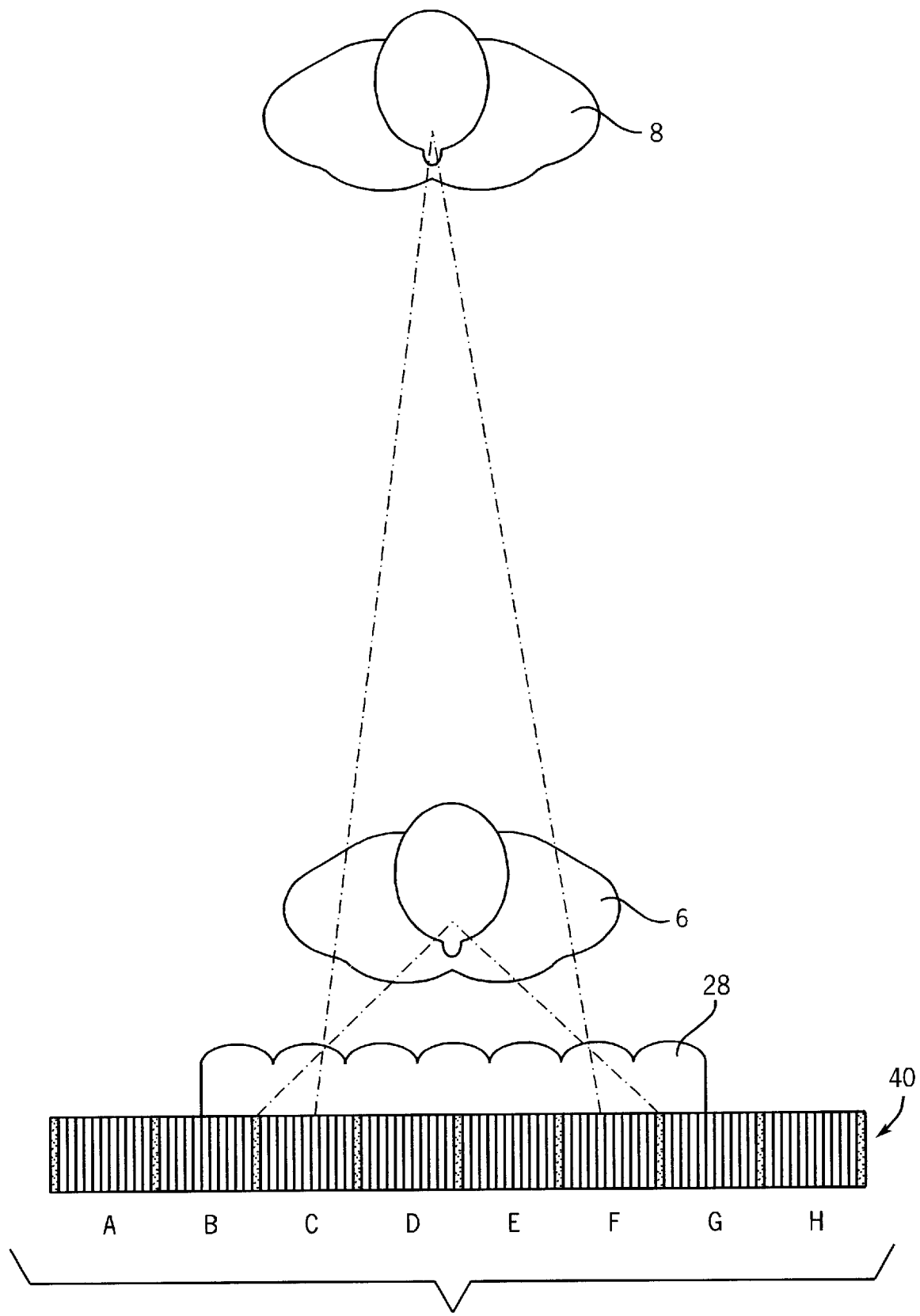

If correspondence is to be maintained, the segments of the interlaced image become coarser as the viewing distance decreases. In other words, the interlaced segments widen since the resolution of the interlaced image must maintain correspondence with the image through the lens from a given viewing distance. FIG. 3 is a representation of correspondence between lens 28 and image 40 (specifically the image segments, i.e., A, B, C . . . ) for viewer 2 at a long (e.g. 12–20 ft.) viewing distance. FIG. 4 is a representation of correspondence for viewer 4 at a short (e.g. arm's length) viewing distance. FIGS. 3 and 4 also show second viewers 4 and 8, respectively, representing someone who is not viewing the image from a proper viewing distance. Such a viewer falls out of correspondence, and would therefore perceive distortion of the image.

Referring again to FIG. 1, and having determined the base resolution, the next step in applying an interlaced image to a curved surface comprises determining a second resolution of the lenticular lens. In this instance, the lens is configured to conform to a curved surface. In a preferred embodiment, this step is accomplished again using of one or more resfinders.

For example, when the curved surface is a cylinder, the lens is configured to the cylinder and one or more resfinders is or are applied until correspondence is achieved. If the curved surface is a cylinder of varying diameter, e.g., frustoconical, then this measuring procedure may be repeated at different diameters over the length of the cylinder. The quality of the interlaced image as viewed through the lenticular lens at a predetermined distance will depend, at least in part, on the number of such measurements.

Once a sufficient number of resolutions have been determined, then the interlaced image is manipulated in any convenient manner to orient the image to the resolutions of the lens in its ultimate non-planner configured state. Depending on the complexity of the surface, this process may need to be repeated. One convenient method for manipulating the image, and specifically the frames of the image, is to use a commercial "warping" software to warp or adjust the image. One such software is Avid Technologies' Elastic Reality™. This software is used to warp the image to compensate for the distortion that will occur in a curved application. There are also other image-warping (also known as image-mapping or distortion) programs that are commercially available. More specifically, the method involves mapping the frames of the image such that the image is warped or bent to achieve correspondence with the multiple resolutions of the lens as ultimately configured to the curved surface.

Another option is to manually adjust the interlaced image differently at different points along the surface. Current commercial technology also permits delaying image manipulation until the point of output, in which case an image file is sent to raster imaging processing (RIP) programs, e.g., Scriptwork®, manufactured and sold by Harlequin. The RIP can then interpret the image at various resolutions or scale factors, thus allowing the interlaced image to be created once and re-used.

After orienting the interlaced image with the lenticular lens in its ultimate configuration, (which again might require several iterations) the image is outputted at a resolution corresponding to its electronic resolution, and at a size that corresponds to the lenticular lens which will eventually overlay it. The interlaced image can be outputted to a film separation, a set of printing plates, a digital proof, or through a high resolution outputting (i.e., digital printing) device, for example, an inkjet printer, a digital press, an electrostatic printer, or a laser printer.

If sent to a digital printing device, the interlaced image may then be either directly or indirectly (i.e., the image is printed to a substrate independently of the lens) printed to the lenticular lens. Otherwise, the interlaced image is preferably sent to an imagesetter or platesetter, both high resolution outputting devices. In the case of an imagesetter, a film separation may be made, and from the separation, a proof or plate may then be created. The proof could then be laminated to the lenticular lens, again such that the image and lens are in correspondence. Alternatively, a plate could be created, and the plate utilized to print, either directly or indirectly (again, using a substrate) to the lenticular lens such that the image and lens are in correspondence. A platesetter could be used instead of an imagesetter to create the plate such that the interlaced image could be printed, again either directly or to the lenticular lens. Here again, the interlaced image and lens would be in correspondence. Preferably, when using a platesetter, a direct digital proof would be created to verify the image integrity (i.e., quality, color, content, etc.). The separation may then be used to create the print to which the lenticular lens can be laminated by any conventional technique.

Using an indirect printing method in which the interlaced image is printed to a substrate, the image can be placed in sufficient contact with the lenticular lens so that the position of the image can be altered or adjusted with respect to the lens (e.g., a non-permanent display), or the image itself interchanged. This is done in a manner such that correspondence between the image and lens is maintained.

Lenticular lenses typically are made from an array of identical spherically-curved surfaces embossed or otherwise formed on the front surface of a plastic sheet. Each individual lens or lenticule is a section of a long cylinder which typically extends the full length of the underlying image to which it is laminated. The back surface of the lens is typically flat.

The lenticular lens is selected to accommodate the image and viewing distance. For a large application, such as the side of a blimp, marquis, or a vending machine facade, a thick, coarse lenticular lens is usually preferred. For smaller applications, e.g., a cup, a fine lenticular lens is preferred. Again, coarse lenticular lenses have fewer lenticules per linear inch than fine lenticular lens. Other factors often considered in the choice of a lenticular lens include the thickness, flexibility, the viewer's viewing distance, and of course, cost of the lens, or method of printing (sheet-fed, lithographic, web, flexography, screen-print, etc.).

Although the construction of an image for application to a curved surface can be described in terms of frames and segments, the image can also be described in terms of frames and rows or other groups of pixels if particular effects are desired. Further, if an electronic or digital base image is prepared, it can be prepared as a grid, and any segment of that grid can serve as a building block for the frame, as previously described.

The geometry (or shape) of the surface to which the image and lenticular lens will be applied or conformed is a factor in the practice of this invention. The surface may be convex (e.g., the external surface of a cup, blimp, etc.), or concave (e.g., inside surface of a package, a room, etc.), or both (e.g., a sinusoidal surface). The surface may be uniform (e.g., a cylinder or sphere), or nonuniform (e.g., the face of a mannequin).

Obtaining correspondence using the resfinder involves viewing the interlaced image through the lenticular lens from the predetermined viewing distance over a predetermined viewing band. The viewing band is an area of the image upon which the viewer focuses at any one time, and it could be smaller than the area of the entire curved surface (see FIG. 18, discussed below). Referring again to the resfinder of FIG. 2. The black (dashed in FIG. 2) frames should be "on" across the entire width of the predetermined viewing band. In other words, the 12f (twelve "frames") black and white resfinder described above, when placed up against the lenticular lens, would show only a continuous black appearance across the entire viewing band.

Figure 5:
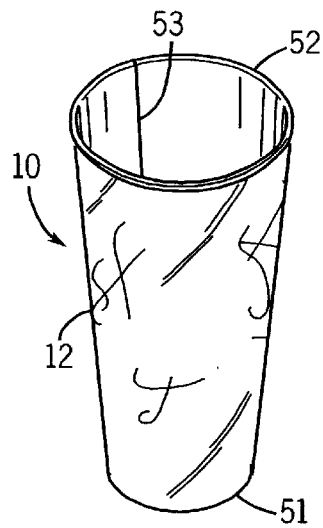
FIG. 5 is an illustration of a frustoconical curved application for multidimensional imaging.
Figure 6:
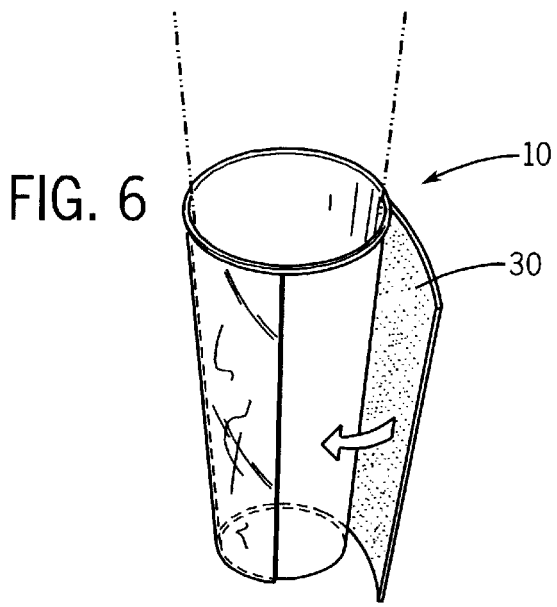
FIG. 6 is an illustration of the application of multidimensional imaging to a frustoconical curved surface.

As shown in FIGS. 5 and 6, a project, such as a tall, frustoconical cup 10, may require the use of multiple viewing bands or areas, each having a different resolution. In such instances, preferably multiple resfinders are used to determine the appropriate resolution for each viewing band. In other words, multiple resfinders are used to determine multiple resolutions.

Figure 7:
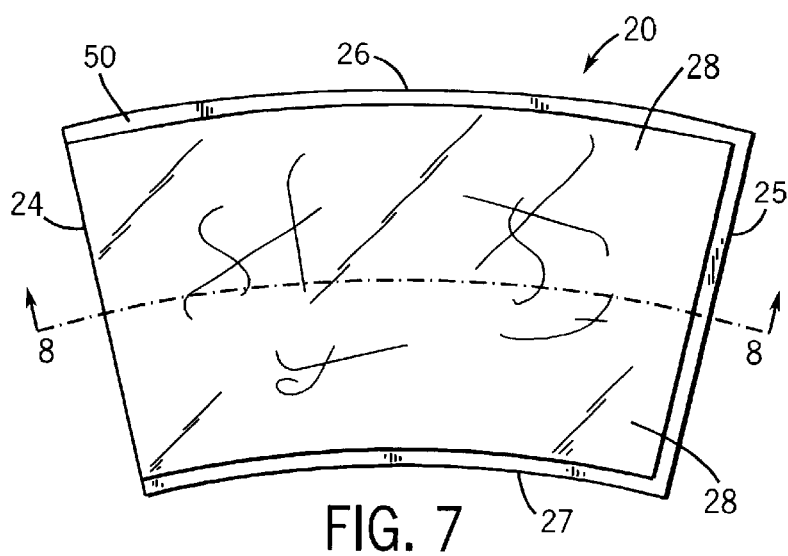
FIG. 7 is a top view of a blank for a frustoconical sidewall of a container, the blank comprising a lenticular lens layer and supporting layer.
Figure 8:
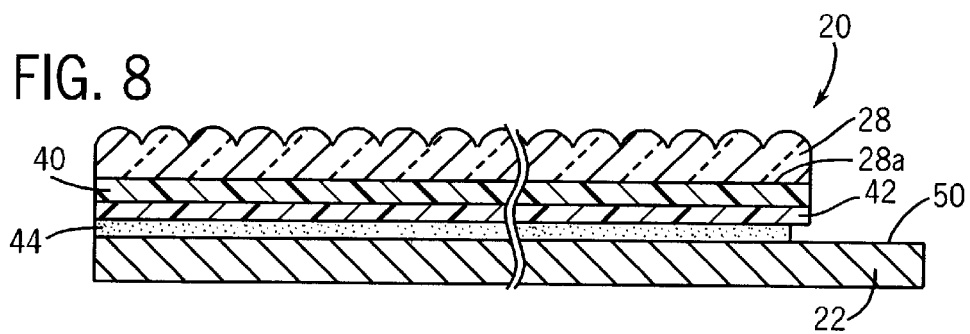
FIG. 8 is a view of the blank taken along section 8—8 of FIG. 7.

Referring to FIGS. 7 and 8, another embodiment of the invention is shown. In this embodiment, a substantially flat composite blank 20 is used to construct an article such as sidewall 12 of frustoconical cup 10 (FIG. 5). Other articles could be constructed. For example, if designed to accommodate a cylinder, the blank's shape would be rectangular (as shown later in FIG. 16). Blank 20 includes substrate layer 22 (shown in FIG. 8) such as paper stock and has a shape or perimeter defined by inwardly tapered left and right edges 24 and 25, respectively, which extend between curved top and bottom edges 26 and 27, respectively. The substrate could be selected from a variety of other materials including: paper, plastic, glass, wood, or metal. The paper itself could be a synthetic paper. A composite substrate could also be used, and in such instances one or more of the previously mentioned materials could be combined, for instance, using an adhesive. A lenticular lens layer 28 could then be mounted thereon.

Figure 15:
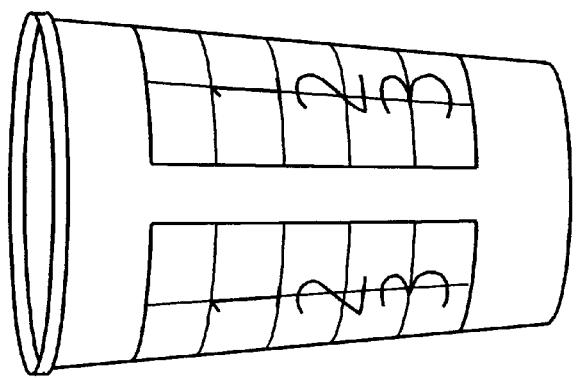
FIG. 15 illustrates the imaging from FIGS. 14 when viewed from a second position.
Figure 14:
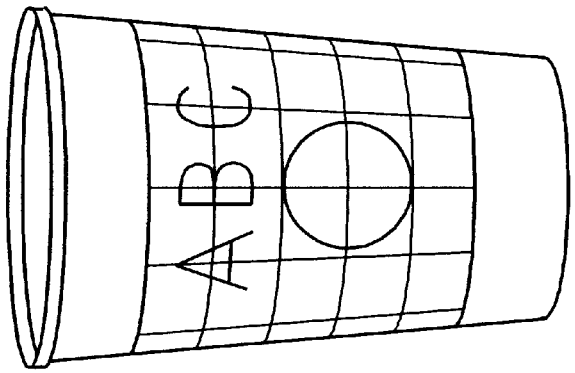
FIG. 14 is an illustration of the prepared imaging from FIG. 13 as applied to a curved surface and viewed from a first position, the imaging being properly viewed on the curved surface.

FIG. 6 illustrates lenticular blank 30 for configuration into a curved surface. Such a blank could be produced by eliminating, for instance, substrate layer 22. As such, lenticular blanks would necessitate only one cut, that is, to cut the lenticular. Such lenticular blanks could be configured into a sleeve to be wrapped around a curved surface, such as an appropriately sized and shaped cup. For such configurations, the blank could have a shape corresponding to the curved surface projected in a planar configuration, such as a rectangle if a cylindrical article were to be produced. The blank could be designed to cover substantially the entire surface of such an article, or a portion thereof (as shown in FIGS. 14 and 15), depending on project goals and specifications. Such a portion is often referred to as a "belly-band". Further, such a blank could be applied to the curved surface by utilizing commercially available labeling equipment. In this way, the interlaced images could appear on a curved surface and provide the viewer with the illusion of motion and/or depth in a manner substantially free of distortion.

FIG. 8, referenced earlier, shows a cross-sectional view of composite blank 20 having substrate layer 22. FIG. 8 more clearly indicates the multi-layered construction of such a blank. As a practical matter, below and adjacent to the flat back side 28a of lenticular lens layer 28 is image layer 40 (preferably comprising the interlaced image described earlier). Coating layer 42 may be inserted between image layer 40 and an adhesive layer 44 for joining the layers into a composite. In other words, in those instances in which the image is printed or otherwise affixed to flat side 28a of the lens, the image is often coated with any suitable material, for example, a vinyl plastic, or an opaque, white ink. This coating (i.e., "floodcoating", or "spotcoating") enhances, or provides contrast for, the image. It may also be used to provide a special effect, such as a glow-in-the-dark effect. Lip 50 comprises substrate layer 22, and is shown in FIGS. 7 and 8. Again, in some instances, more than one lip might be required, and in other instances, such a lip might not be required at all.

Figure 11:
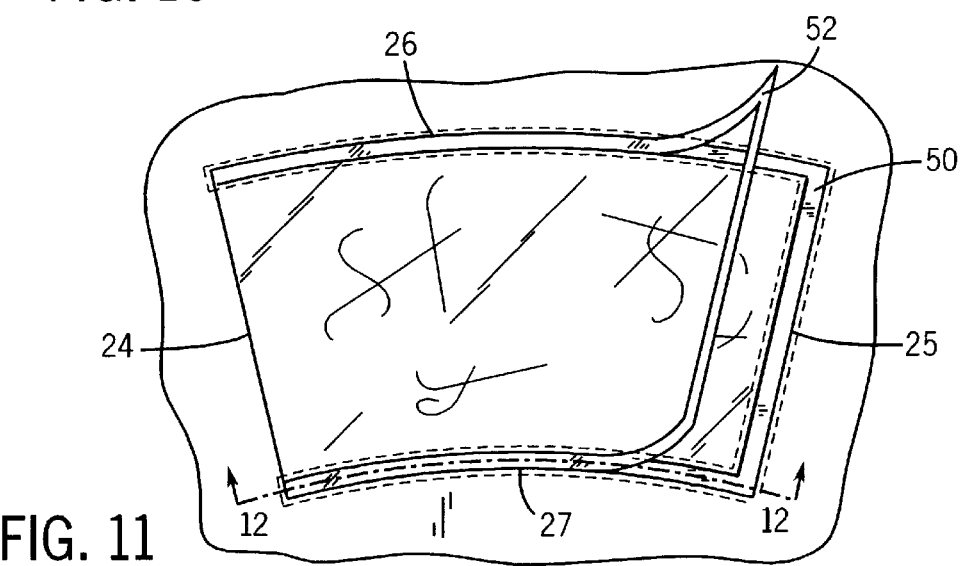
FIG. 11 is a top view of a blank and supporting material from FIG. 9 for a frustoconical sidewall of a container, the blank comprising a lamination of a lenticular lens and a supporting layer, the view displaying removal of a portion during production thereof.

Using the construction of cup 10 as an example, an interlaced image is printed or otherwise affixed to the flat side of a lenticular lens (in appropriate correspondence, of course). If desired, the surface of the image opposite the surface adjoining the lens is covered with an appropriate coating as described above. The lens is then cut (i.e., die cut) to the desired configuration (here, the frustoconical shape projected in a planar configuration, as shown in FIGS. 7, 9 and 11 (described further below).

Separately, appropriate paper stock is prepared by coating a surface with an appropriate adhesive. Subsequently, the cut lens is applied to the adhesive-containing surface of the paper stock in such as manner that the lens is essentially permanently affixed to the stock to form a blank precursor. Of course, the lens is applied to the stock such that its image-carrying surface (or alternatively, its coating surface) joins the adhesive-carrying surface of the stock to form a blank precursor.

Figure 9:
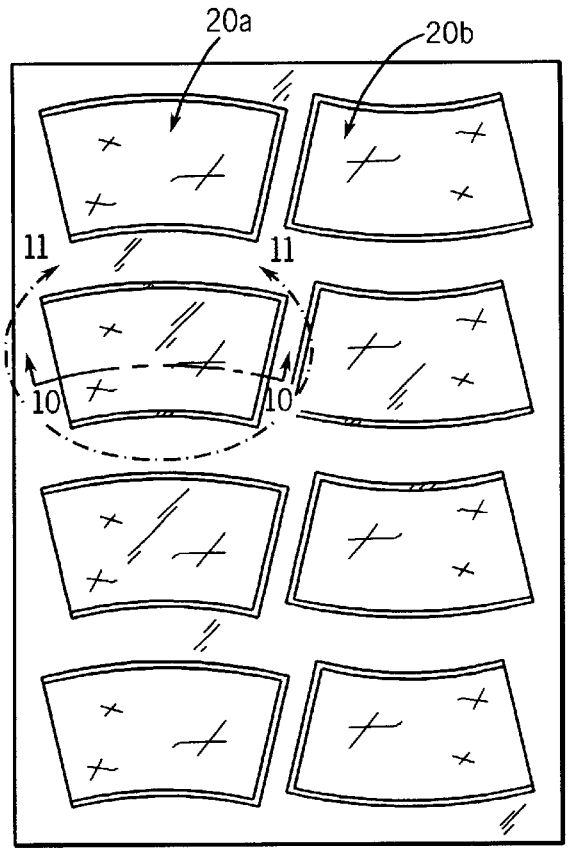
FIG. 9 is a top view of an arrangement of multiple blanks on a single sheet for large production runs.

As shown in FIG. 9, if the paper stock and the lenticular printed sheet are of sufficient size, multiple blanks (for example, 20a and 20b) may be "nested" as shown, or otherwise arranged, to conserve space. In this manner, more than one blank may be formed simultaneously, and thus, mass production is promoted. While FIG. 9 has been referred as a printed sheet, it should be understood that the illustration could represent other printing methods (as described earlier). For instance, FIG. 9 could be an impression area of a webform.

Once the lens (and image and coating, if any) is permanently affixed to the paper stock, the blank precursor is cut (e.g., die-cut) to produce composite blank 20 for forming into the shape of the article desired. Blank 20 is cut such that lip 50 of paper stock is created. Again, in an alternative embodiment, the blank may include two or more lips, or even none at all if the lenticular lens layer is sufficiently thin to permit the formation of the final product without any such lips. The lip(s), if any, assist in the formation of bottom rim 51 and top rim 52 of cup 10 (as shown in FIG. 5). The lip(s) may also facilitate attachment of edges 24 and 25 along sideseam 53 of cup 10 (also FIG. 5).

Figure 10:
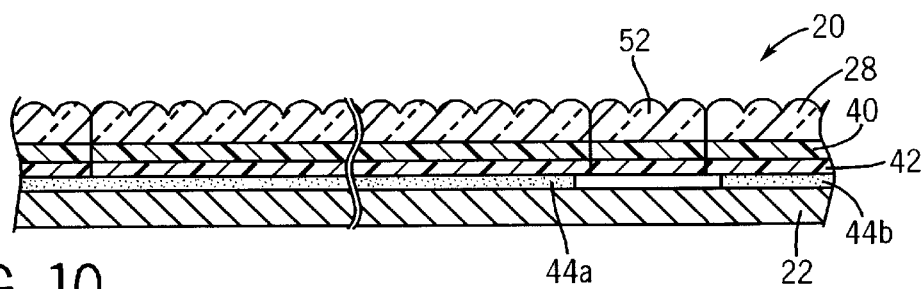
FIG. 10 is a view taken along section 10—10 of one of the blanks from FIG. 9.
Figure 12:
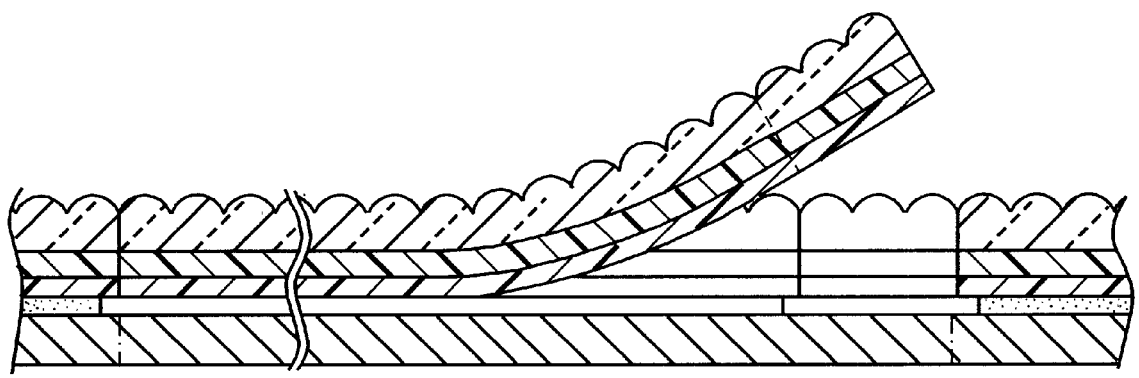
FIG. 12 is a view that is taken along section 12—12 of the blank from FIG. 11.

In another embodiment, blank 20 for the construction of an article having at least one curved surface, and as shown in FIGS. 10, 11, and 12 be produced by mounting lenticular lens layer 28, image layer 40, and coating layer 42 to substrate 22. A spot adhesive process could be applied to either the lens layer, substrate layer, or both, so that area comprising lip 50 of the blank could remain substantially free of adhesive layer 44. This is illustrated in FIGS. 10 and 12 as a gap between adhesive layer portions 44a and 44b. Absence of adhesive is also shown in FIG. 11 using dashed lines.

Referring to FIGS. 11 and 12, in this embodiment, preferably a "kiss" die cut could be performed so as to cut a lenticular lens portion 52, along with an image layer 40 and coating layer 42, if any, overlaying the area of lip 50. This could be performed while permitting the substrate 22 to remain uncut. Lenticular portion 52, remaining substantially free of any adhesive, along with any image and coating layer, could then be easily removed as shown in FIGS. 11 and 12. The lenticular layer and substrate could then be die-cut along any desired perimeter (such as that defined by edges 24, 25, 26, and 27) so as to form blank 20. It should be clear that the cuts referred to above (i.e., the "kiss" die cut and the die cut along the perimeter of the blank) could happen in one operation.

Figure 13:
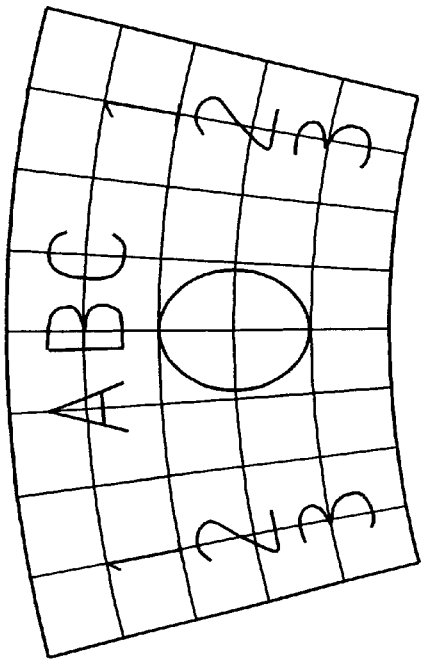
FIG. 13 is an illustration of imaging that is prepared in accordance with the present invention prior to its application to a curved surface.

FIGS. 13, 14 and 15 show basic imaging (i.e., numbers, letters, and a shape), applied to the curved frustoconical surface. More specifically, FIG. 13 illustrates a typical lenticular blank comprising imaging, the blank suitable for making a sleeve to be applied to a cup (more specifically, a "belly-band" since here the sleeve, once wrapped, does not extend over the entire exterior surface of the cup). Utilizing the imaging techniques of the present invention, FIGS. 13–15 illustrate that the images -as applied to the curved surface—appear with little, if any, distortion.

Figure 18:
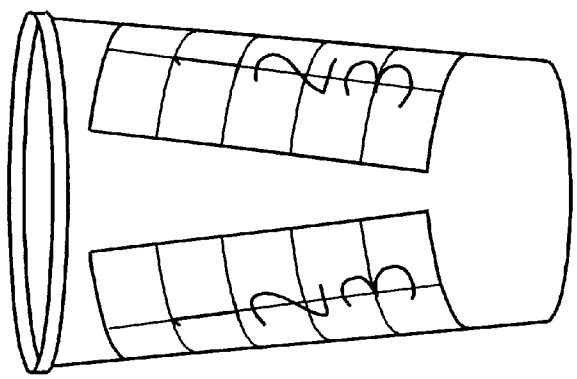
FIG. 18 illustrates the imaging from FIGS. 17 when viewed from a second position.
Figure 17:
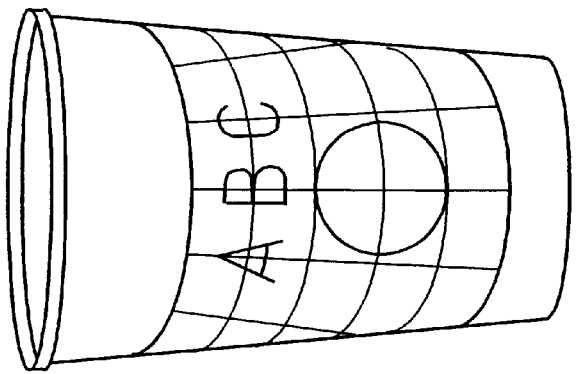
FIG. 17 is an illustration of the imaging from FIG. 16 being applied to a curved surface and viewed from a first position, and further illustrating that the imaging, not having been prepared in accordance with the present invention, is not properly viewed, and does not appropriately fit, on the curved surface.
Figure 16:
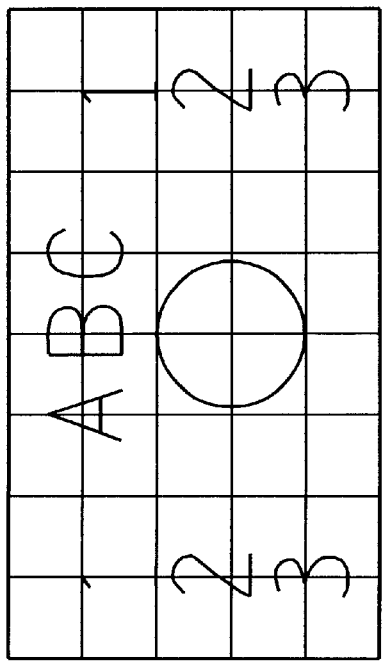
FIG. 16 is an illustration of imaging that is not prepared in accordance with the present invention prior to its application to a curved surface.

FIGS. 16, 17 and 18 illustrate a blank similar to that of FIGS. 13—15 except that the blank is now rectangular. As noted earlier, such a blank would be useful for application to the surface of a cylinder. However, as one may readily see, such a blank does not properly fit around a more complex shape, i.e., a frustoconical. Therefore, the geometry of the blank itself (or the shape of the curved surface projected in a planar configuration) must be adjusted to account for the more complex shape of the article.

More significant with regard to the present invention, one may note that in FIGS. 17 and 18 the imaging appears distorted to the viewer because it has not been prepared in accordance with the present invention for application to the curved surface. For example, the the circle from FIG. 17 appears as an oval in FIG. 18. Of course, these are only basic images (line art) and are used by way of example only. Elements that make up the images (i.e, graphics, video, etc.) of the kind envisioned for use in accordance with the present invention are significantly more complex. The method of preparing multidimensional imaging, for instance an interlaced image, for application to a curved surface of the kind described in detail above is especially suitable and preferable for these more complex elements.

The present invention has been described in terms of preferred embodiments, and it is recognized that equivalents, alternatives, and modifications, aside from those expressly stated, are possible and within the scope of the appending claims.

What is claimed is:

1. A method for preparing an interlaced image for application to a curved surface, the interlaced image comprising two or more frames, such that when the interlaced image is viewed through a lenticular lens, the lens comprising a plurality of lenticules and having a base resolution, from a predetermined viewing distance, the interlaced image is viewed substantially free of distortion, the method comprising the steps of:

A. determining the base resolution of the lens;
   B. determining a resolution of the lens when the lens is configured to conform to the curved surface;
   C. manipulating the interlaced image, the image comprising interlaced segments, to conform with the resolution of the lens as applied to the curved surface such that the lenticules of the lens are in correspondence with the segments of the image, and
   D. outputting the interlaced image for application to the curved surface.

2. The method of claim 1 wherein the method further comprises the step of mapping at least one of the frames.

3. The method of claim 1 wherein the interlaced image is an interlaced, composite image comprising a plurality of frames, and wherein at least one of the frames is a composite frame, the composite frame comprising a plurality of elements.

4. The method of claim 1 wherein the step of determining the base resolution comprises the steps of:

A. creating a resfinder; and
   B. manipulating the resfinder so that the resfinder and the lenticular lens are in correspondence.

5. The method of claim 4 wherein the resfinder comprises a series of interlaced segments of an image.

6. The method of claim 5 wherein the segments comprise frames.

7. The method of claim 6 wherein the segments of the resfinder are aligned with the lenticules of the lenticular lens to achieve correspondence.

8. The method of claim 1 wherein the step of outputting the interlaced images comprises outputting the interlaced image to a high-resolution outputting device.

9. The method of claim 8 wherein the high resolution outputting device is one of: an inkjet printer, a digital press, an electrostatic printer, a laser printer, an image setter, and a platesetter.

10. A curved surface comprising an interlaced image made by the method of claim 1.

11. The method of claim 1 further comprising the step of applying the interlaced image to the curved surface.

12. A method for making a substantially flat, composite blank comprising at least one lip to facilitate construction of an article, the blank comprising at least one curved surface, the method comprising the steps of:

A. printing an interlaced image to one of a lenticular leas and a substrate such that the image is in correspondence with the lens;
   B. applying an adhesive to at least one of the substrate and the lenticular lens;
   C. mounting the lenticular lens to the substrate;
   D. cutting a portion of the lenticular lens;
   E. cutting the substrate along a desired perimeter to form the composite blank; and
   F. removing a portion of the lenticular lens.

13. A method for making a substantially flat, composite blank comprising at least one lip to facilitate construction of an article, the blank comprising at least one curved surface, the method comprising the steps of:

A. printing an interlaced image to one of a lenticular lens and a substrate such that the image is in correspondence with the lens;
   B. applying an adhesive to at least one of the substrate and the lenticular lens so that the portion of the lenticular lens overlaying the at least one lip remains substantially free of any adhesive;
   C. mounting the lenticular lens to the substrate;
   D. cutting a portion of the lenticular lens;
   E. cutting the substrate along a desired perimeter to form the composite blank; and
   F. removing a portion of the lenticular lens.

14. A method for making a substantially flat, composite blank comprising at least one lip to facilitate construction of an article, the blank comprising at least one curved surface, the method comprising the steps of:

A. printing an interlaced image to one of a lenticular lens and a substrate such that the image is in correspondence with the lens;
   B. applying an adhesive to at least one of the substrate and the lenticular lens so that the portion of the lenticular lens overlaying the at least one lip remains substantially free of any adhesive;
   C. mounting the lenticular lens to the substrate;
   D. cutting a portion of the lenticular lens which overlays the at least one lip;
   E. cutting the substrate along a desired perimeter to form the composite blank; and
   F. removing a portion of the lenticular lens.

* * * * *